(12) United States Patent
Whittenberger

(10) Patent No.: US 7,269,795 B2
(45) Date of Patent: Sep. 11, 2007

(54) DYNAMICALLY GENERATED USER INTERFACE FOR BUSINESS APPLICATION INTEGRATION

(75) Inventor: Kevin Whittenberger, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 739 days.

(21) Appl. No.: 10/384,343

(22) Filed: Mar. 7, 2003

(65) Prior Publication Data

US 2004/0176967 A1    Sep. 9, 2004

(51) Int. Cl.
*G06F 3/00* (2006.01)
*G06F 3/14* (2006.01)
*F06F 3/01* (2006.01)

(52) U.S. Cl. ............................ 715/764; 715/738
(58) Field of Classification Search .............. 719/329
See application file for complete search history.

(56) References Cited

U.S. PATENT DOCUMENTS

| | | | |
|---|---|---|---|
| 6,407,753 B1* | 6/2002 | Budinsky et al. ......... | 715/764 |
| 6,662,237 B1* | 12/2003 | Leckie ................. | 719/320 |
| 6,816,865 B2* | 11/2004 | O'Brien et al. ........... | 707/100 |
| 2003/0043192 A1 | 3/2003 | Bouleau | |
| 2003/0195765 A1* | 10/2003 | Sehgal et al. ............ | 705/1 |

OTHER PUBLICATIONS

Abrams, et al., M., "UIML: an appliance-independence XML user interface language", Computer Networks, vol. 31, No. 11-16, pp. 1695-1708, May 17, 1999.
European Search Report dated Nov. 24, 2006 for Application No. 04003311.0.

\* cited by examiner

*Primary Examiner*—Weilun Lo
*Assistant Examiner*—Jordany Nunez
(74) *Attorney, Agent, or Firm*—John D. Veldhuis-Kroeze; Westman, Champlin & Kelly, P.A.

(57) ABSTRACT

A method of providing a user interface for mapping entities between a plurality of business applications in an integrated business solutions computing environment is provided. A first system specific assembly and first user interface configuration data is retrieved for a first entity. A second system specific assembly is retrieved for a second entity of a second application. A dynamic user interface is generated based upon the first system specific assembly, first user interface configuration data and second system specific assembly.

18 Claims, 8 Drawing Sheets

DYNAMICALLY GENERATED USER INTERFACE FOR BUSINESS APPLICATION INTEGRATION

BACKGROUND OF THE INVENTION

The present invention relates to the integration of business applications in an integrated business solutions computing environment. More specifically, the present invention relates to a dynamic user interface for integrating such business applications.

Businesses have typically used a variety of mechanisms to control and analyze business operations such as accounting, payroll, human resources, employee tracking, customer relations tracking, etc. Tools which provide these functions are often implemented using computer software. For example, a software package may manage business accounting, another software package might be responsible for receiving new orders, yet another software package will track warehouse inventory and still another package may handle order fulfillment and shipment. In another example, a business software package operated by one business will need to exchange data with a software package operated by another business to allow a business-to-business transaction to occur.

When business tools are implemented in software, it is not unusual for proprietary software packages to be responsible for each individual business task. However, this implementation is cumbersome and requires the same data to be entered in differing formats among the various business applications. In order to improve efficiency, integration applications have been developed which are used to integrate various elements of one business application with elements of another business application.

For example, if a software package which is used to obtain new orders includes objects (or "entities") having data fields of the form CustomerNameLast and CustomerNameFirst, it is straightforward to map those entries to accounting software having entities the data fields BillingAddressFirst and BillingAddressLast. In such an integration system, the relationship between entities in one system (i.e., computer system or application) and entities in another system can be stored in tables. A system administrator can configure entity mapping between the systems by selecting between the various entities of the two systems.

In order to facilitate the entity mapping configuration performed by the system administrator, user interfaces are used which present the entity tables in a user friendly format. However, such a user interface is typically a custom solution which must be specifically coded for each integration application.

SUMMARY OF THE INVENTION

A method of providing a dynamic user interface for mapping entities between a plurality of business applications in an integrated business solutions computing environment is provided. A first system specific assembly and first user interface configuration data is retrieved for a first entity. A second system specific assembly is retrieved for a second entity of a second application. A dynamic user interface is generated based upon the first system specific assembly, first user interface configuration data and second system specific assembly. A dynamic user interface and system for generating such an interface are also provided.

DETAILED DESCRIPTION OF THE PREFERRED EMBODIMENTS

Figure 1:
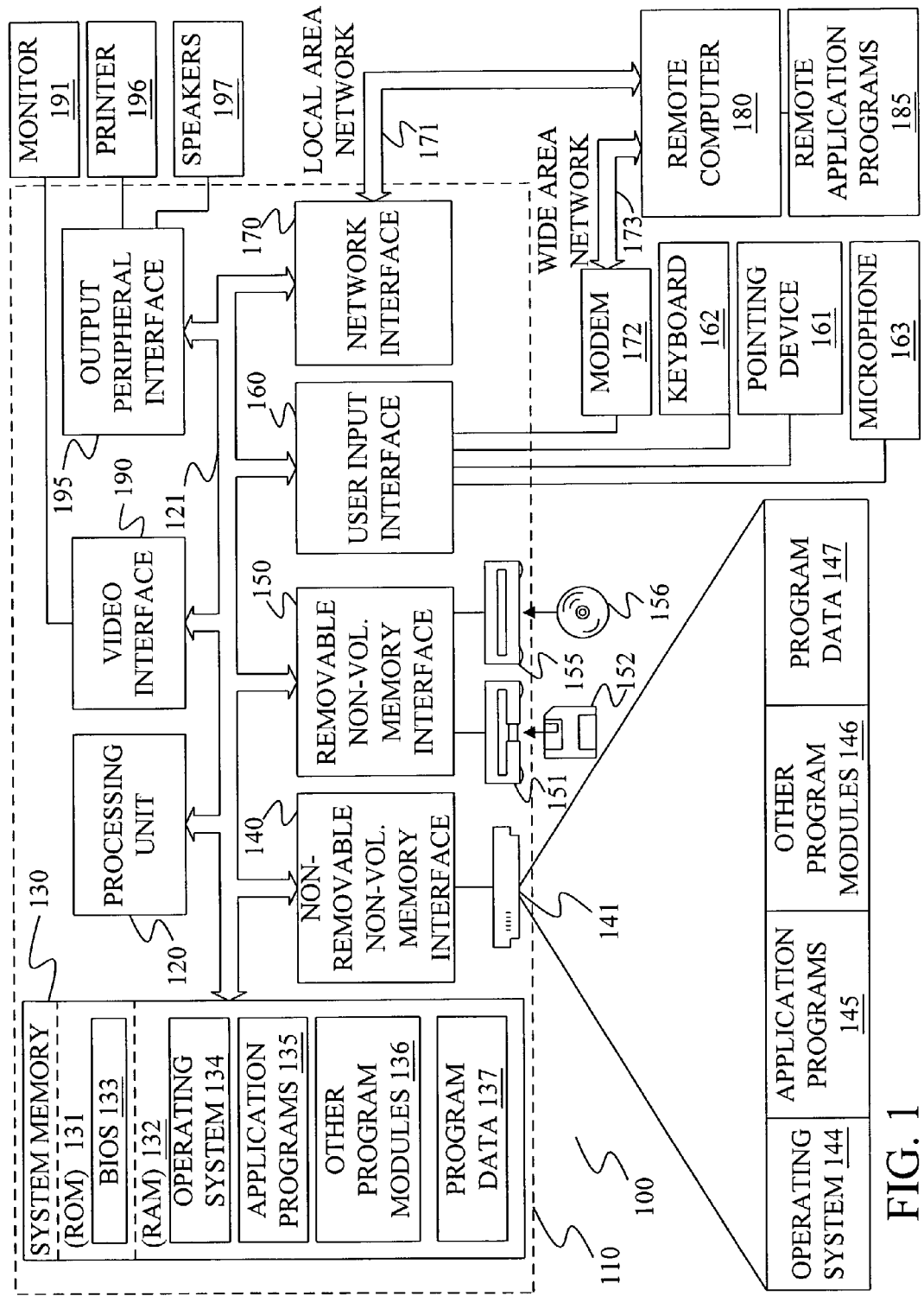
FIG. 1 is one exemplary embodiment of an environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. For natural user interface applications, a user may further communicate with the computer using speech, handwriting, gaze (eye movement), and other gestures. To facilitate a natural user interface, a computer may include microphones, writing pads, cameras, motion sensors, and other devices for capturing user gestures. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
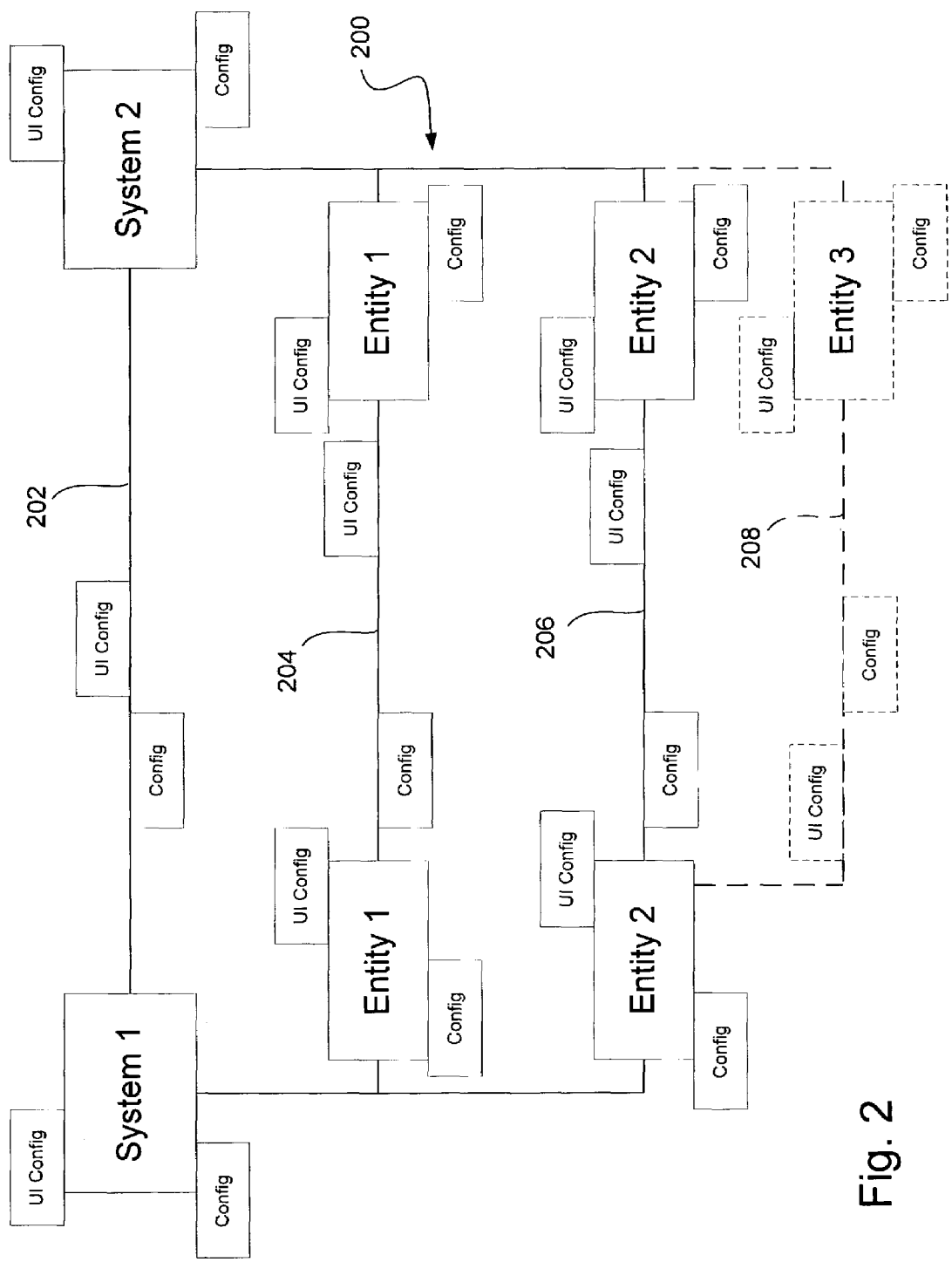
FIG. 2 is a schematic diagram which illustrates operation of the user interface generator of the present invention.

FIG. 2 is a simplified block diagram which graphically illustrates an integration engine or user interface generator 200 for generating a user interface for mapping entities between two business systems in accordance with the present invention. As used herein, a "system" can refer to different computer systems such as single computer system 110 and 180 shown in FIG. 1, or different business applications such as application programs 135 running on a single computer system 110. In the example of FIG. 2, mapping between System 1 and System 2 is illustrated. System 1 includes two entities, Entity 1 and Entity 2. Similarly, System 2 includes two entities, Entity 1 and Entity 2. FIG. 2 also illustrates a System Mapping 202 which maps between System 1 and System 2 and Entity Mappings 204 and 206 which map between each system's Entity 1 and each system's Entity 2. Further, each System, each Entity and each Map 202, 204 and 206 includes Configuration Data which is associated with a system level, an Entity level, a System mapping level and an Entity mapping level. Similarly, each System, Entity and Map includes User Interface Configuration Data which can be, for example, an XML text string. The configuration illustrated in FIG. 2 can be implemented through known techniques, such as data base tables, which store and define the relationships between the Systems, Entities, Maps, Configuration Data and User Interface Configuration Data.

In general, engine 200 relates entities on one system to entities on another system and provides a dynamic user interface for controlling this relationship. For example, if System 1 receives a sales order from System 2, and Entity 2 relates to inventory methods, the Configuration Data for Entity 2 can define how inventory is allocated when a sales order is received from System 2. The Configuration Data is such that it can be assigned to a particular System or Entity, but also assigned based upon how it is mapped to another System or Entity.

FIG. 2 also illustrates an example in which Entity 2 of System 1 is mapped to a second entity, Entity 3 of System 2 based upon Map 208. For example, the shipping method of System 1 can map to a shipping method associated with an account, a shipping method associated with a contact, a shipping method associated with an order and a shipping method associated with an invoice on System 2. In that case, a single entity in system 1 is mapped to multiple entities in system 2.

The User Interface Configuration Data (represented by the "UI CONFIG" boxes in FIG. 2) associated with each node provides the particular user interface for that System, Entity or Map. For example, the User Interface Configuration Data for System 1 and System 2 can be in the form of user selectable tabs which are defined in a markup language such as XML. When System 1 is selected, its User Interface Configuration Data brings up a set of tabs which allow an administrator to configure Entity 1, Entity 2 or Maps 202, 204 and 206 for System 1 relative to System 2.

The particular user interface can be selected as desired, for example, textboxes, dropdown lists, checkboxes, radio buttons, tabs, etc. An example of user interface configuration data XML fragment is as follows:

| String 1 |
|---|
| <lookup> |
| <tab> |
| <field> |

In this string, the <tab> entry refers to a particular tab on the user interface, for example, a tab which identifies System 1.

The <field> entry provides the particular user input form described above. The <lookup> section of the XML string fragment describes the specific lookup to a system. For example, if the user interface is to display a list of shipping methods which are available, the <lookup> section defines this list. When a particular <field> requires a shipping method list, it refers to the <lookup> section to obtain the list.

In order for the information set forth in FIG. 2 to dynamically generate a user interface, the system and entity names are obtained in a user friendly format. This can be achieved using a standardized interface referred to herein as ISystemProxy. This interface is implemented for each system, such as with DLLs. For example, if customer A in System 1 has been linked to customer B in System 2, the particular key values of the two Entities are typically not user friendly (they could be 32 bit GUIDS, for example). Similarly, the two Systems may reside on different physical servers and may not allow their data to be exposed using normal database connections. The ISystemProxy has methods that can be invoked to query the integration engine illustrated in FIG. 2 for a list of entities that have been linked. Each System is then queried for a list of entities which are returned as, for example, XML files. The ISystemProxy can be implemented in a custom DLL for each particular System and provides a standardized interface for loading the tables of the integration engine 200 with system specific data. However, the data store of the present invention can be populated using any appropriate technique including hard coding the system specific data during authoring or deployment. For example, the tables can be populated by submitting an XML string of the format:

| String 2 |
|---|
| <entity name    value attribute    display attribute> |

The entity name entry is the name of an Entity or table definition. For example, for every shipping method contained in a System, an XML string in the format of String 2 can be provided to the integration engine 200. The value attribute provides the identification key of a particular shipping method, for example "1". The display attribute provides a user friendly identification of the key, for example "UPS", "Federal Express", etc.

During operation, the integration engine 200 takes source pick list data, for example the XML string from System 1, and destination pick list data, for example an XML string from System 2, and places those lists into a temporary table. Then, the Entity in System 1 defined in accordance with the String 2 entry is joined with the appropriate entity or entities in System 2 based upon the Entity Maps 204, 206, 208. Using pick lists or other techniques, the administrator can then map a shipping method from one System to a shipping method of another System. For example, a shipping method 1 may correspond to UPS shipping for System 1 whereas shipping method B can correspond to UPS shipping for System 2. When the administrator selects Entity 1 (shipping methods) for System 1, a popup window or other input field is provided with a pick list of selectable fields for the available entities on System 2.

Figure 3:
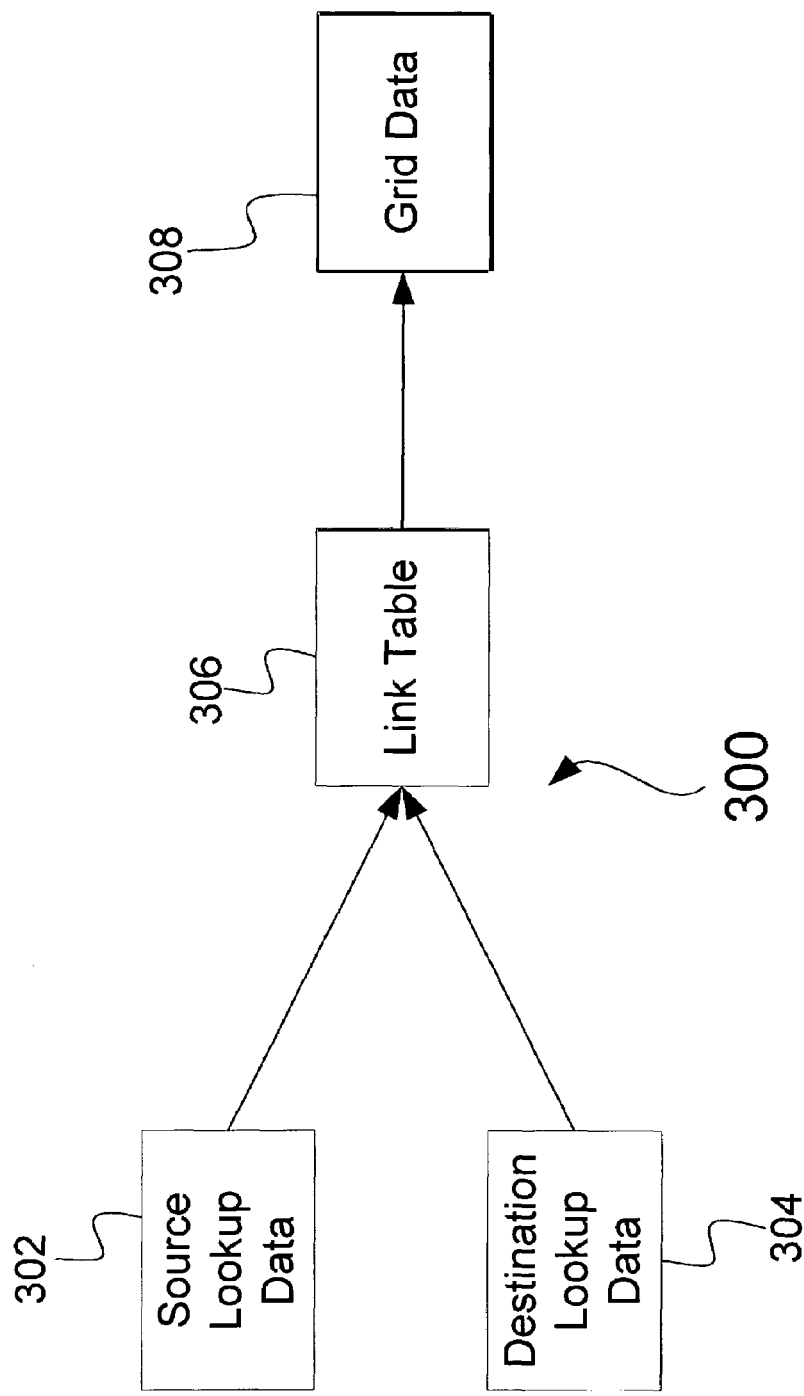
FIG. 3 is a block diagram showing the joining of source lookup data, destination lookup data and a link table into grid data.

FIG. 3 is a block diagram 300 in which source lookup data stored in table 302 and destination lookup data stored in table 304 is joined based upon the relationships defined in a link table 306. The link table sets forth the mapping illustrated by Entity Maps 204, 206 and 208 in FIG. 2. For example, if the source and destination lookup data is stored in a SQL database, this joining can be through a SQL query. The joined data is stored in table 308 as grid data and can comprise a plurality of data tables.

In some instances the administrator may change the configuration of an Entity. For example, assume Entity 1 for System 1 is of the following form:

| String 3 |
| --- |
| <entity 1><br><name><br><telephone><br></entity 1> |

Subsequently, assume the administrator changes Entity 1 to include a city field such as:

| String 4 |
| --- |
| <entity 1><br><name><br><telephone><br><city><br></entity 1> |

The dynamic user interface of the invention generates the modified XML string which is returned to engine 200. The new Entity format can be conveyed to System 2, or at least an indication provided to System 2 that the Entity is changed.

Figure 4:
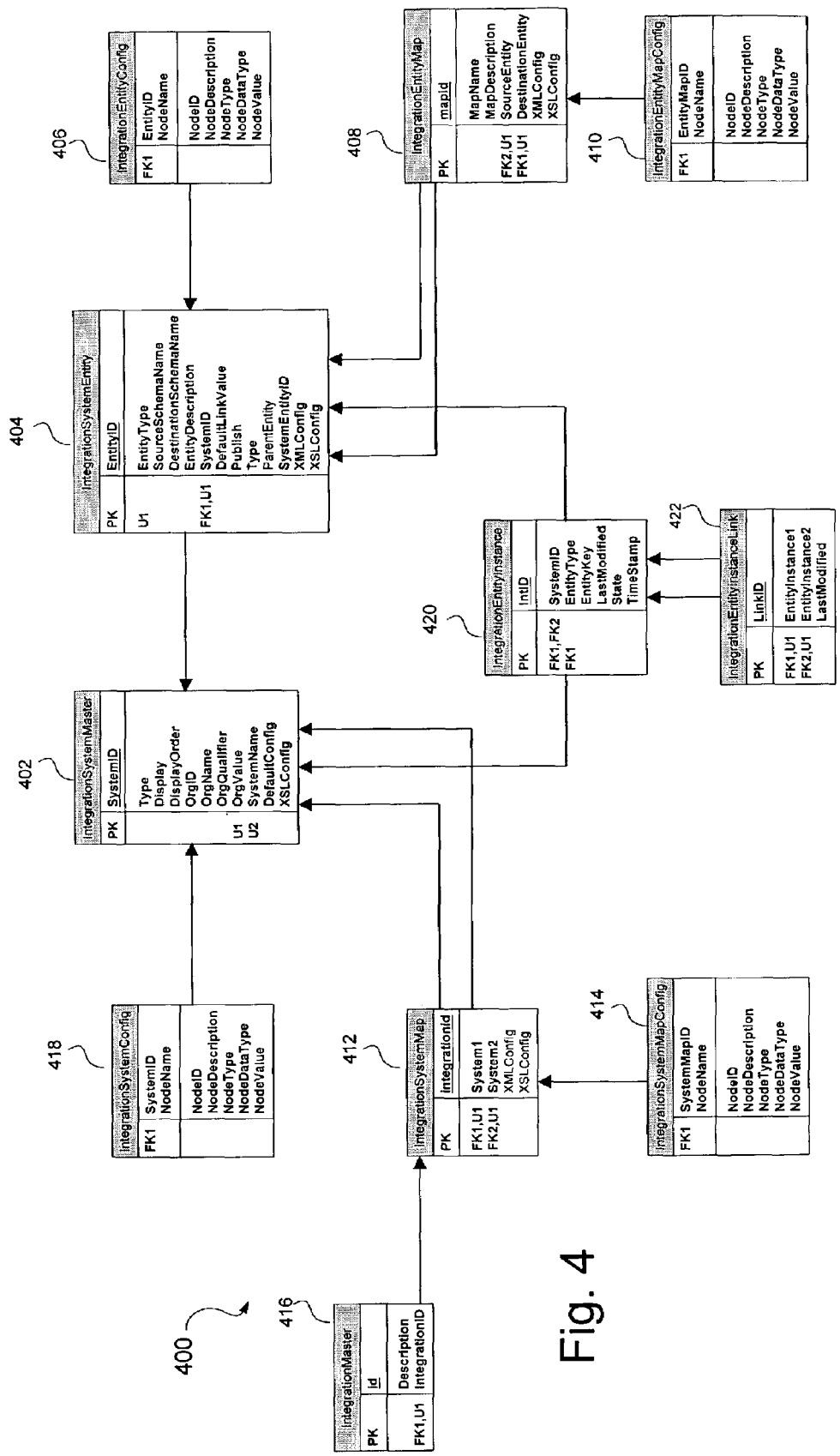
FIG. 4 is a schematic diagram showing an example data store of the present invention.

FIG. 4 is a block diagram of a system specific data store configuration 400 in one specific exemplary embodiment. An integration system master table 402 includes a primary key (PK) associated with the System ID. The actual system name is associated with a unique index, U2. Table 402 also contains other information such as display information, default configuration and XML configuration.

Table 404 provides integration system entity information including entity type, the source schema name, the system schema name, publication information, etc. and includes a foreign key (FK1) which identifies a particular System ID. An integration entity configuration table 406 is keyed to a foreign key (FK1) and provides an entity identification node name to identify a particular node in the data store 400 and its configuration data. Integration entity map table 408 provides the mapping data used to map between two entities in two systems. Source and destination entities are identified with foreign keys. Table 410 provides specific mapping configuration data for a node in the data 400. Integration system map table 412 and integration system map configuration table 414 are used to map between two systems. They are linked to an overall integration master table 416. Integration system configuration table 418 maintains node configuration data for a system. The actual linking between entities is provided by integration entity instance table 420 and integration entity instance link table 422. Table 420 identifies a particular entity and table 422 provides the link between entities. An archive table (not shown) can also be used to store historical data and track changes to the entity links.

One embodiment of primary steps to generate and display the dynamic user interface of the invention are as follows:

| Primary Display Steps |
| --- |
| 1. Extract XML configuration node from appropriate system table.<br>2. For each tab group identified in the node:<br>  a. For each section in the tab group:<br>    i. For each field in the section:<br>      1. Determine UI type.<br>      2. If lookup data required, call appropriate system proxy and retrieve XML lookup data.<br>      3. Create appropriate UI widget.<br>      4. If UI type is list-type (drop-down, list table), add each node from XML lookup data.<br>      5. If UI type is linked entity table, call table generator.<br>        a. Load linked entity records.<br>        b. Load source system entity records.<br>        c. Load destination system entity records.<br>        d. Combine record sets.<br>      6. Return Dynamic HTML code from UI Widget.<br>      7. Return code.<br>    ii. Return section code.<br>  b. Return tab group code.<br>3. Pass page code to browser. |

Figure 5:
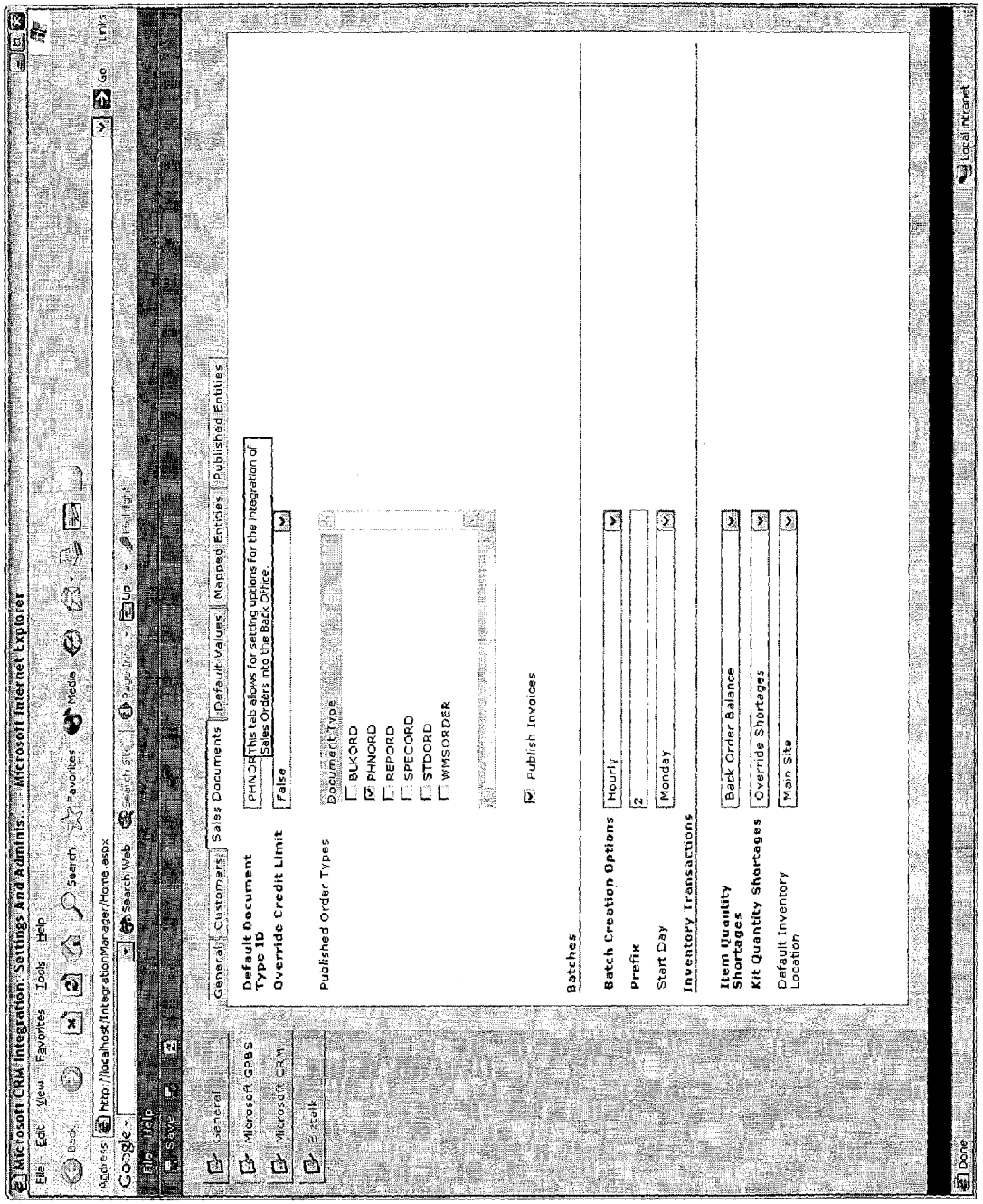
FIG. 5 is a screen shot which illustrates a user interface for configuring an entity of a business application.
Figure 6:
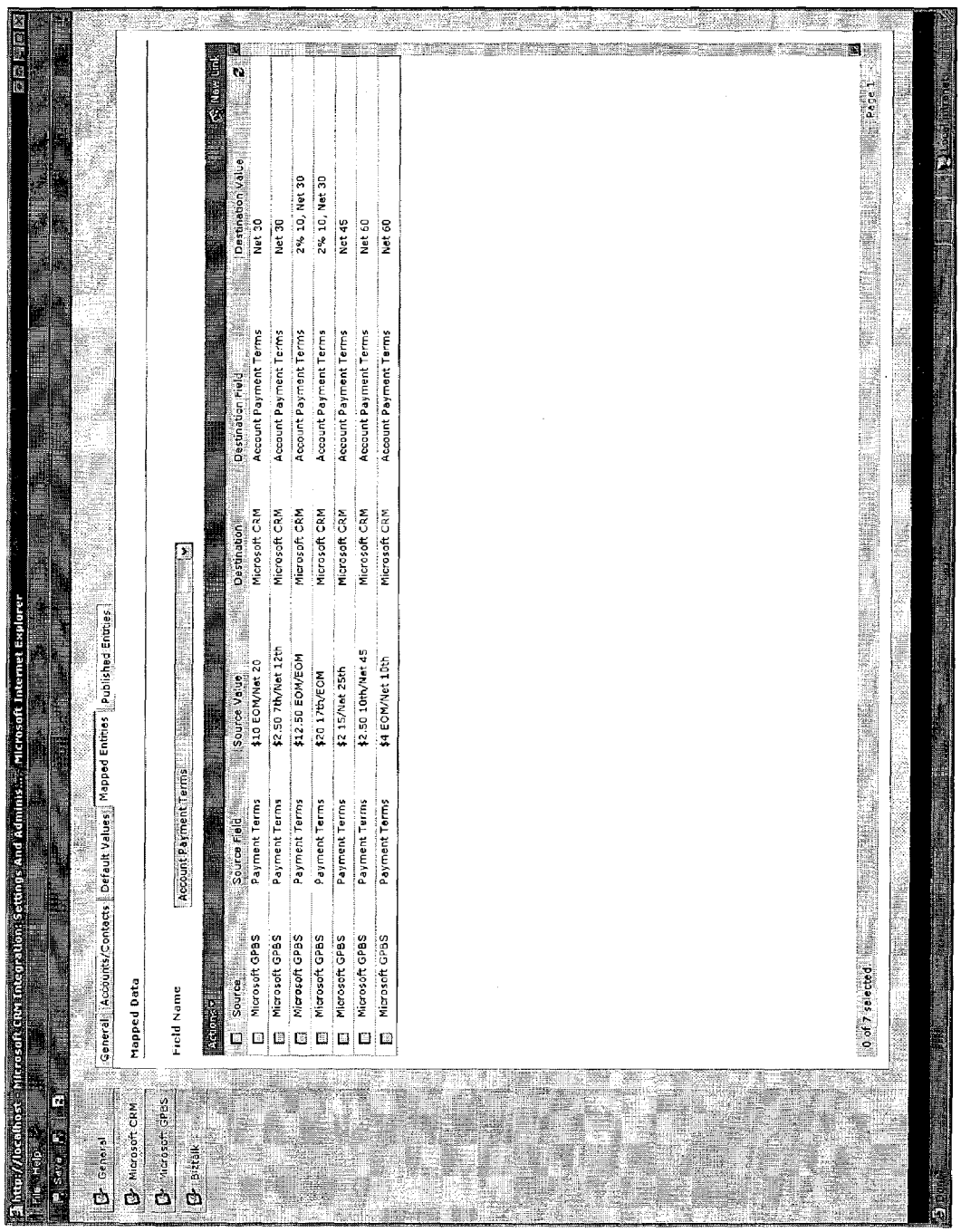
FIG. 6 is a screen shot showing a user interface for mapping entities.

In the above steps, an XML configuration node is extracted from the appropriate system table set forth in FIG. 4. Based upon the extracted XML configuration node data, each tab group of the user interface is identified for the node (as shown in FIGS. 5 and 6). For each section in the tab group, and for each field in the section, the particular user interface type is determined. If lookup data is required, a system proxy is called which provides XML lookup data for the particular field, the appropriate user interface is created. In operation, input field of the dynamic user interface (pick list, button, etc.) is based upon the determined user interface type and any lookup data which was obtained. If the user interface is a list type (a dropdown list, table, etc.) each particular node is added from the XML lookup data. On the otherhand, if the user interface type is a linked entity table, a table generator routine is called in which all the linked entity records are loaded, the source system entities are loaded, and the destination system entities are loaded (for example through querying proxies). These record sets are then joined. Next, dynamic HTML code is generated to link the appropriate system specific data and the appropriate user interface. The final page is assembled and passed to the browser.

Once an administrator has entered configuration data into the user interface defined by the dynamic XML page, that configuration data must be submitted to the integration engine such that entries in the tables set forth in FIG. 4 can be populated. During such a save operation, the following general steps are performed:

| Save Steps |
| --- |
| 1. Receive XML node of data to be saved.<br>2. For each node.<br>  a. Determine save type.<br>    i. If integration configuration, or<br>    ii. If system default data<br>      1. Save data value to appropriate config table and record |

| Save Steps |
| --- |
| iii. If new entity link, pass data to platform to create links. |
| iv. If system configuration, load system proxy, and pass data to appropriate interface method. |

In the save steps set forth above, if a field has changed, an XML node is received for the new data to be saved. For each node received, the particular save type is determined (for example, integration, configuration or system default data) and the data value is saved into the appropriate configuration table shown in FIG. 4. If a new entity link is created, an XML string is passed to the integration engine to create the appropriate link by populating the appropriate link instance in the data store 400 shown in FIG. 4. If the new entry relates to system configuration, a system proxy is called for the appropriate system and the data is passed to the system using the appropriate interface technique.

The pick list data can be obtained using any appropriate technique including hard coding the data store with system specific data or other input techniques. However, an automated technique can be used in which a server proxy is defined for each system and used to return pick list data for that system. The server proxy operates in accordance with a standardized interface. As one example, a retrieve pick list call can be made to a server proxy of the form:

RetrievePickList (String ConfigData) String 5

The config data can be, for example, one large XML string which is comprised of all of the data for a particular node. The string will contain data for at least one lookup node. The data can be generated using the appropriate query technique for a given system, for example by using a SQL query. In such a configuration, the string is parsed to identify the lookup node and then a connection string is retrieved from the config data. One example connection string could be of the form, server=server A; database 2. The RetrievePickList then returns the large XML string. However, this can be configured as appropriate for a particular system, for example by parsing out the server name and passing the entity to the appropriate server. The XML string is also updated to include the appropriate entity name used by the integration engine for a particular entity. In general, all of the configuration data is passed so that any desired data can be parsed from the string.

The present invention provides a dynamic user interface for configuring business systems using an XML string generated from a system specific assembly. Further, system specific assemblies can be formed for any system, and the integration engine can be used across multiple platforms. An interface to exchange data is implemented on each system in accordance with an interface specification. The integration engine can then query the interface and be used to populate the assembly. This allows the interface to be designed generically and the system data that is automatically retrieved is used to populate the assembly as desired. The XML code is used as a description of the user interface. This can be combined with a system interface to interrogate each system in the integration.

FIG. 5 is a screen shot showing an example user interface in accordance with the present invention. In FIG. 5, a plurality of tabs are arranged vertically to allow an administrator to select a particular system. Within the selected system, specific tabs are arranged horizontally to allow the configuration and mapping of entities. In the example of FIG. 5, Sales Document configuration is selected which allows the administrator to select default sales document type identification, how a credit limit is handled, what order types are to be published from the system and what invoices are to be published. The page also allows the administrator to select how sales documents are to be batched, the frequency for how sales documents are batched, when sales documents are batched and how inventory transactions are handled.

Figure 7:
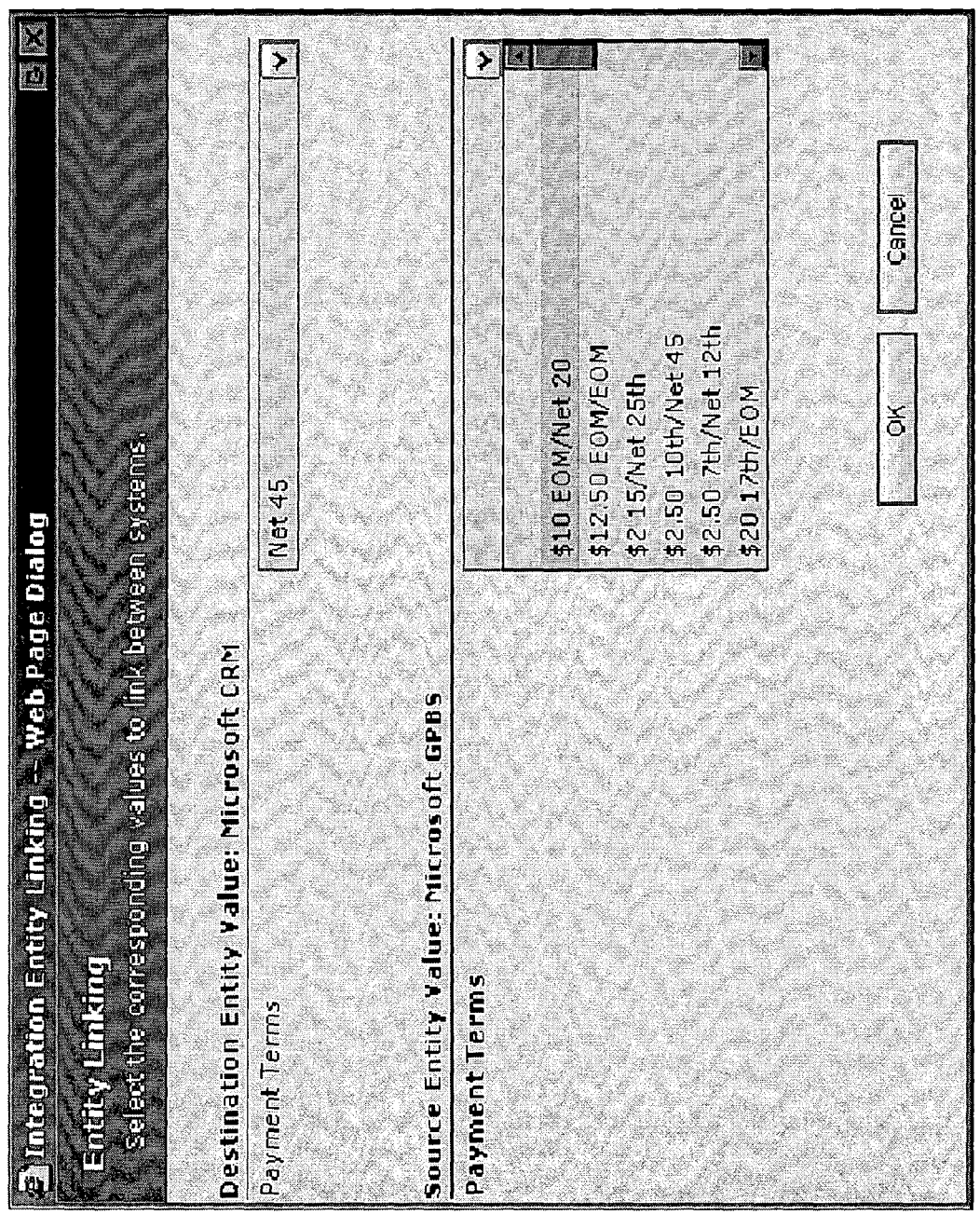
FIG. 7 is a screen shot showing a user interface for configuring the mapping shown in FIG. 6.

FIG. 6 shows a horizontal tab selected which graphically illustrates the mapping of payment terms between systems (the "Mapped Entities"). In FIG. 7, various payment term values from one system are mapped to or linked to payment term values in another system. A dropdown list allows a system administrator to select from other field names. Note that this table can also be viewed from the destination system perspective in which the source fields and destination fields are reversed.

Figure 8:
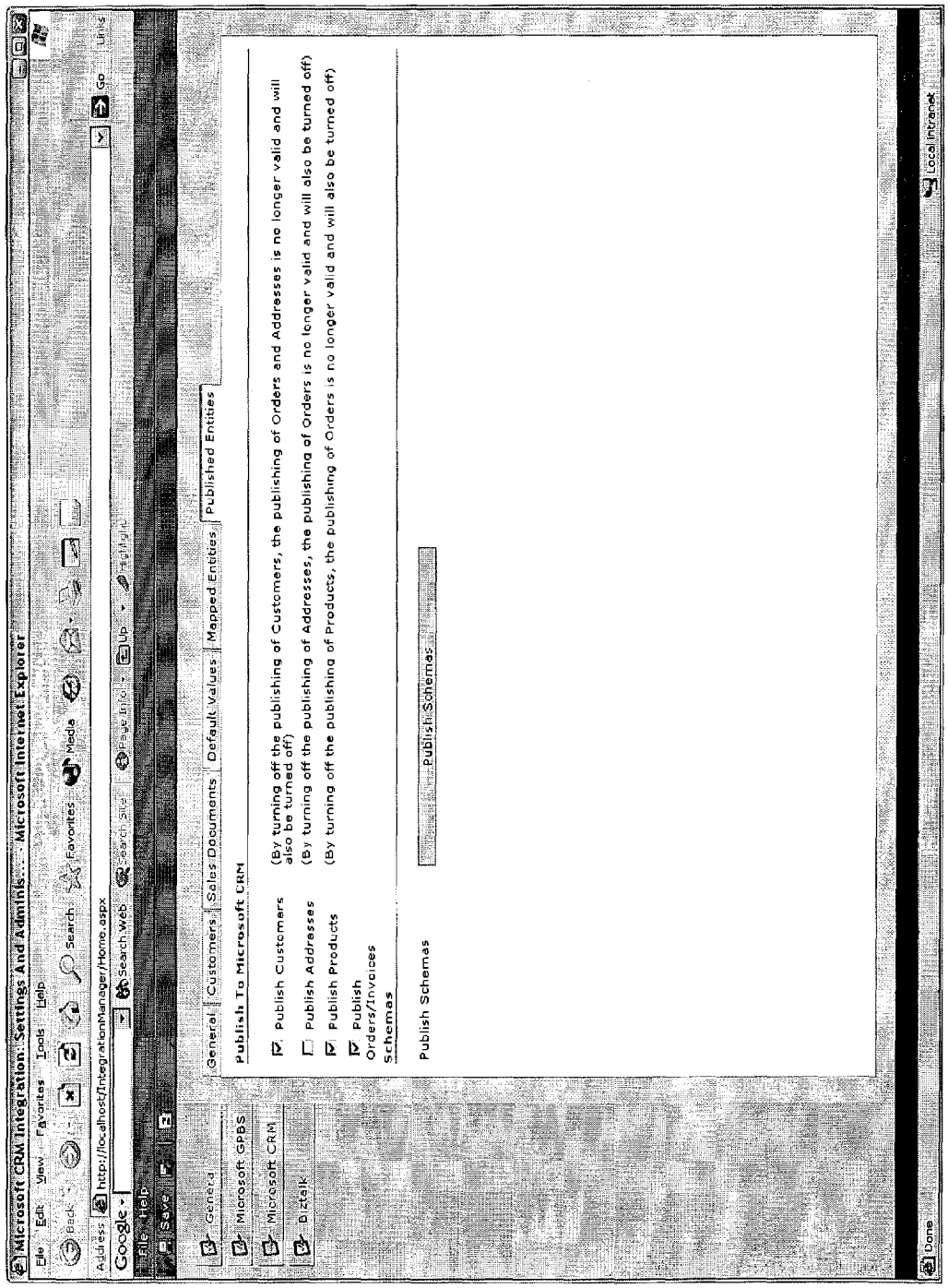
FIG. 8 is a screen shot showing a user interface for controlling the publication of entities.

FIG. 8 shows one embodiment of the dialog of the user interface which allows an administrator to select which entities are published. Note that if one entity is not published, another entity may also not be published. For example, if the address entity is not published, the publishing of the orders entity is no longer valid and so the orders entity will also not be published.

Although the dynamic user interface of the present invention can be generated as desired, one example user interface configuration XML instance for such a dynamic user interface is as follows:

| UI Configuration XML Instance for Dynamic UI. |
| --- |
| Schema:<br><xs:schema attributeFormDefault="unqualified"<br>elementFormDefault="qualified"<br>xmlns:xs="http://www.w3.org/2001/XMLSchema"><br>   <xs:element name="Config"><br>     <xs:complexType><br>       <xs:sequence><br>         <xs:element maxOccurs="unbounded" name="LookupSource"><br>           <xs:complexType><br>             <xs:attribute name="name" type="xs:string" use="required" /><br>             <xs:attribute name="entity" type="xs:unsignedShort" use="required" /><br>             <xs:attribute name="entityType" type="xs:string" use="required" /><br>             <xs:attribute name="displayfield" type="xs:string" use="required" /><br>             <xs:attribute name="lookupsource" type="xs:string" use="required" /><br>             <xs:attribute name="lookupentity" type="xs:string" use="required" /><br>             <xs:attribute name="sourcefield" type="xs:string" use="required" /><br>             <xs:attribute name="query" type="xs:string" use="required" /><br>             <xs:attribute name="order" type="xs:string" use="required" /><br>           </xs:complexType><br>         </xs:element><br>         <xs:element name="scripts"><br>           <xs:complexType><br>             <xs:sequence> |

-continued

UI Configuration XML Instance for Dynamic UI.

```xml
        <xs:element name="SCRIPT">
            <xs:complexType>
                <xs:simpleContent>
                    <xs:extension base="xs:string">
                        <xs:attribute name="LANGUAGE" type="xs:string" use="required" />
                    </xs:extension>
                </xs:simpleContent>
            </xs:complexType>
        </xs:element>
    </xs:sequence>
</xs:complexType>
</xs:element>
<xs:element maxOccurs="unbounded" name="tab">
    <xs:complexType mixed="true">
        <xs:sequence minOccurs="0">
            <xs:element maxOccurs="unbounded" name="field">
                <xs:complexType>
                    <xs:sequence minOccurs="0">
                        <xs:element minOccurs="0" maxOccurs="unbounded" name="option">
                            <xs:complexType>
                                <xs:attribute name="name" type="xs:string" use="required" />
                                <xs:attribute name="label" type="xs:string" use="required" />
                                <xs:attribute name="value" type="xs:string" use="required" />
                                <xs:attribute name="default" type="xs:unsignedByte" use="required" />
                            </xs:complexType>
                        </xs:element>
                        <xs:element name="event">
                            <xs:complexType>
                                <xs:attribute name="name" type="xs:string" use="required" />
                                <xs:attribute name="value" type="xs:string" use="required" />
                            </xs:complexType>
                        </xs:element>
                    </xs:sequence>
                    <xs:attribute name="name" type="xs:string" use="required" />
                    <xs:attribute name="title" type="xs:string" use="required" />
                    <xs:attribute name="entity" type="xs:string" use="required" />
                    <xs:attribute name="entityType" type="xs:string" use="required" />
                    <xs:attribute name="disabled" type="xs:unsignedByte" use="required" />
                    <xs:attribute name="clientOnly" type="xs:unsignedByte" use="required" />
                    <xs:attribute name="boldlabel" type="xs:unsignedByte" use="required" />
                    <xs:attribute name="label" type="xs:string" use="required" />
                    <xs:attribute name="visible" type="xs:unsignedByte" use="required" />
                    <xs:attribute name="maxlength" type="xs:unsignedByte" use="required" />
                    <xs:attribute name="req" type="xs:unsignedByte" use="required" />
                    <xs:attribute name="datatype" type="xs:string" use="required" />
                    <xs:attribute name="displayfield" type="xs:string" use="required" />
                    <xs:attribute name="lookupsource" type="xs:string" use="required" />
                    <xs:attribute name="lookupentity" type="xs:string" use="required" />
                    <xs:attribute name="sourcefield" type="xs:string" use="required" />
                    <xs:attribute name="query" type="xs:string" use="required" />
                    <xs:attribute name="colspan" type="xs:unsignedByte" use="optional" />
                    <xs:attribute name="col" type="xs:unsignedByte" use="optional" />
                    <xs:attribute name="description" type="xs:string" use="optional" />
                </xs:complexType>
            </xs:element>
        </xs:sequence>
        <xs:attribute name="visible" type="xs:unsignedByte" use="required" />
        <xs:attribute name="type" type="xs:string" use="required" />
        <xs:attribute name="name" type="xs:string" use="required" />
        <xs:attribute name="label" type="xs:string" use="required" />
        <xs:attribute name="title" type="xs:string" use="optional" />
    </xs:complexType>
</xs:element>
    </xs:sequence>
</xs:complexType>
</xs:element>
</xs:schema>
Instance:
<Config>
    <LookupSource name="account-shippingmethodcode" entity="1" entityType="RetrievePicklist" displayfield="" lookupsource="" lookupentity="address1_shippingmethodcode" sourcefield="" query="" order="" />
    <LookupSource name="account-paymenttermscode" entity="1" entityType="RetrievePicklist" displayfield="" lookupsource="" lookupentity="paymenttermscode" sourcefield="" query="" order="" />
    <LookupSource name="contact-shippingmethodcode" entity="2" entityType="RetrievePicklist" displayfield="" lookupsource="" lookupentity="address1_shippingmethodcode" sourcefield="" query="" order="" />
    <LookupSource name="contact-paymenttermscode" entity="2" entityType="RetrievePicklist" displayfield="" lookupsource="" lookupentity="paymenttermscode" sourcefield="" query="" order="" />
    <LookupSource name="salesorder-shippingmethodcode" entity="1088" entityType="RetrievePicklist" displayfield="" lookupsource="" lookupentity="shippingmethodcode" sourcefield="" query=" " order="" />
    <LookupSource name="salesorder-paymenttermscode" entity="1088" entityType="RetrievePicklist" displayfield="" lookupsource="" lookupentity="paymenttermscode" sourcefield="" query="" order="" />
    <LookupSource name="invoice-shippingmethodcode" entity="1090" entityType="RetrievePicklist" displayfield="" lookupsource="" lookupentity="shippingmethodcode" sourcefield="" query="" order="" />
    <LookupSource name="invoice-paymenttermscode" entity="1090" entityType="RetrievePicklist" displayfield="" lookupsource="" lookupentity="paymenttermscode" sourcefield="" query="" order="" />
    <LookupSource name="accountcategorycode" entity="1" entityType="RetrievePicklist" displayfield="" lookupsource="" lookupentity="accountcategorycode" sourcefield="" query="" order="" />
    <LookupSource name="producttypecode" entity="1024" entityType="RetrievePicklist" displayfield="" lookupsource="" lookupentity="producttypecode" sourcefield="" query=" " order="" />
    <scripts>
        <SCRIPT LANGUAGE="javascript">
        function ShowSchemaWindow( )
        {
            var
```

-continued

UI Configuration XML Instance for Dynamic UI.

```
sFeatures="dialogHeight:200px;dialogWidth:600px;help:no";
    window.showModalDialog("./getschema.aspx","",sFeatures);
    }
    function LoadScripts( )
    {
    };
    </SCRIPT>
  </scripts>
  <tab visible="1" type="edit" name="General"
label="General">
    <field name="GeneralOptions" title="" entity=""
entityType="Options" disabled="0" clientOnly="0" boldlabel="0"
label="General Information" visible="1" maxlength="0" req="1"
datatype="sec" displayfield="" lookupsource="" lookupentity=""
sourcefield="" query="" />
    <field name="OrganizationName" title=""
entity="OrganizationName" entityType="ConfigData" disabled="0"
clientOnly="0" boldlabel="0" label="Organization Name"
visible="1" maxlength="20" req="0" datatype="display"
displayfield="" lookupsource="" lookupentity="" sourcefield=""
query=" " />
    </field name="FunctionalCurrencyConfig" title=""
entity="FunctionalCurrencyConfig" entityType="ConfigData"
disabled="0" clientOnly="0" boldlabel="0" label="Functional
Currency" visible="1" maxlength="20" req="0" datatype="display"
displayfield="" lookupsource="" lookupentity="" sourcefield=""
query=" " />
  </tab>
  <tab visible="1" type="edit" name="AccountContact"
label="Accounts/Contacts">
    <field name="CustomerOptions" title="" entity=""
entityType="Options" disabled="0" clientOnly="0" boldlabel="0"
label="Account/Contact Options" visible="1" maxlength="0"
req="1" datatype="sec" displayfield="" lookupsource=""
lookupentity="" sourcefield="" query="" />
    <field name="AccountCreationOptionConfig" title=""
entity="AccountCreationOptionConfig" entityType="ConfigData"
disabled="0" clientOnly="0" boldlabel="0" label="Create
customers as:" visible="1" maxlength="4" req="1"
datatype="picklist" displayfield=" "
lookupsource="CompanyDatasource" lookupentity=" " sourcefield="
" query=" ">
      <option name="Account" label="Account"
value="0" default="1" />
      <option name="Contact" label="Contact"
value="1" default="0" />
      <event name="" value="" />
    </field>
  </tab>
  <tab visible="1" type="edit" name="DefaultValues"
label="Default Values">
    <field name="ProductOptions" title="" entity=""
entityType="Options" disabled="0" clientOnly="0" label="Product"
boldlabel="0" visible="1" maxlength="0" req="1" datatype="sec"
displayfield="" lookupsource="" lookupentity="" sourcefield=""
query="" />
    <field name="producttypecode" title=""
entity="producttypecode" entityType="DefaultValue" disabled="0"
clientOnly="0" label="Product Type Code" boldlabel="0"
visible="1" maxlength="10" req="1" datatype="picklist"
displayfield="" lookupsource="producttypecode"
lookupentity="DATA" sourcefield="" query=" " />
    <field name="ProductOptionsSep" title="" entity=""
entityType="Options" disabled="0" clientOnly="0" label=""
boldlabel="0" visible="1" maxlength="0" req="1" datatype="sec"
displayfield="" lookupsource="" lookupentity="" sourcefield=""
query="" />
    <field name="AccountOptions" title="" entity=""
entityType="Options" disabled="0" clientOnly="0" label="Account"
boldlabel="0" visible="1" maxlength="0" req="1" datatype="sec"
displayfield="" lookupsource="" lookupentity="" sourcefield=""
query="" />
    <field name="accountcategorycode" title=""
entity="accountcategorycode" entityType="DefaultValue"
disabled="0" clientOnly="0" label="Account Category Code"
boldlabel="0" visible="1" maxlength="10" req="0"
datatype="picklist" displayfield=""
```

-continued

UI Configuration XML Instance for Dynamic UI.

```
lookupsource="accountcategorycode" lookupentity="DATA"
sourcefield="" query=" " />
    <field name="account-shippingmethodcode" title=""
entity="account-shippingmethodcode" entityType="DefaultValue"
disabled="0" clientOnly="0" label="Shipping Method"
boldlabel="0" visible="1" maxlength="10" req="0"
datatype="picklist" displayfield="" lookupsource="account-
shippingmethodcode" lookupentity="DATA" sourcefield="" query=" "
/>
    <field name="account-paymenttermscode" title=""
entity="account-paymenttermscode" entityType="DefaultValue"
disabled="0" clientOnly="0" label="Payment Terms" boldlabel="0"
visible="1" maxlength="10" req="0" datatype="picklist"
displayfield="" lookupsource="account-paymenttermscode"
lookupentity="DATA" sourcefield="" query=" " />
    <field name="ContactOptionsSep" title="" entity=""
entityType="Options" disabled="0" clientOnly="0" label=""
boldlabel="0" visible="1" maxlength="0" req="1" datatype="sec"
displayfield="" lookupsource="" lookupentity="" sourcefield=""
query="" />
    <field name="ContactOptions" title="" entity=""
entityType="Options" disabled="0" clientOnly="0" label="Contact"
boldlabel="0" visible="1" maxlength="0" req="1" datatype="sec"
displayfield="" lookupsource="" lookupentity="" sourcefield=""
query="" />
    <field name="contact-shippingmethodcode" title=""
entity="contact-shippingmethodcode" entityType="DefaultValue"
disabled="0" clientOnly="0" label="Shipping Method"
boldlabel="0" visible="1" maxlength="10" req="0"
datatype="picklist" displayfield="" lookupsource="contact-
shippingmethodcode" lookupentity="DATA" sourcefield="" query=" "
/>
    <field name="contact-paymenttermscode" title=""
entity="contact-paymenttermscode" entityType="DefaultValue"
disabled="0" clientOnly="0" label="Payment Terms" boldlabel="0"
visible="1" maxlength="10" req="0" datatype="picklist"
displayfield="" lookupsource="contact-paymenttermscode"
lookupentity="DATA" sourcefield="" query=" " />
    <field name="SalesOrderOptionsSep" title=""
entity="" entityType="Options" disabled="0" clientOnly="0"
label="" boldlabel="0" visible="1" maxlength="0" req="1"
datatype="sec" displayfield="" lookupsource="" lookupentity=""
sourcefield="" query="" />
    <field name="SalesOrderOptions" title="" entity=""
entityType="Options" disabled="0" clientOnly="0" label="Sales
Order" boldlabel="0" visible="1" maxlength="0" req="1"
datatype="sec" displayfield="" lookupsource="" lookupentity=""
sourcefield="" query="" />
    <field name="salesorder-shippingmethodcode" title=""
entity="salesorder-shippingmethodcode" entityType="DefaultValue"
disabled="0" clientOnly="0" label="Shipping Method"
boldlabel="0" visible="1" maxlength="10" req="0"
datatype="picklist" displayfield="" lookupsource="salesorder-
shippingmethodcode" lookupentity="DATA" sourcefield="" query=" "
/>
    <field name="salesorder-paymenttermscode" title=""
entity="salesorder-paymenttermscode" entityType="DefaultValue"
disabled="0" clientOnly="0" label="Payment Terms" boldlabel="0"
visible="1" maxlength="10" req="0" datatype="picklist"
displayfield="" lookupsource="salesorder-paymenttermscode"
lookupentity="DATA" sourcefield="" query=" " />
    <field name="InvoiceOptionsSep" title="" entity=""
entityType="Options" disabled="0" clientOnly="0" label=""
boldlabel="0" visible="1" maxlength="0" req="1" datatype="sec"
displayfield="" lookupsource="" lookupentity="" sourcefield=""
query="" />
    <field name="InvoiceOptions" title="" entity=""
entityType="Options" disabled="0" clientOnly="0" label="Invoice"
boldlabel="0" visible="1" maxlength="0" req="1" datatype="sec"
displayfield="" lookupsource="" lookupentity="" sourcefield=""
query="" />
    <field name="invoice-shippingmethodcode" title=""
entity="invoice-shippingmethodcode" entityType="DefaultValue"
disabled="0" clientOnly="0" label="Shipping Method"
```

UI Configuration XML Instance for Dynamic UI.

```
boldlabel="0" visible="1" maxlength="10" req="0"
datatype="picklist" displayfield="" lookupsource="invoice-
shippingmethodcode" lookupentity="DATA" sourcefield="" query=" "
/>
        <field name="invoice-paymenttermscode" title=""
entity="invoice-paymenttermscode" entityType="DefaultValue"
disabled="0" clientOnly="0" label="Payment Terms" boldlabel="0"
visible="1" maxlength="10" req="0" datatype="picklist"
displayfield="" lookupsource="invoice-paymenttermscode"
lookupentity="DATA" sourcefield="" query=" " />
    </tab>
    <tab visible="1" type="grid" name="MappedFields"
title="This tab shows those entity values that have been mapped
that originated in the Front Office." label="Mapped Entities">
        <field name="MappedEntities" title=""
entity="MappedEntities" entityType="Options" disabled="0"
clientOnly="0" boldlabel="0" label="Mapped Data" visible="1"
maxlength="0" req="1" datatype="sec" displayfield=""
lookupsource="" lookupentity="" sourcefield="" query="" />
        <field name="SourceEntity" title=""
entity="SourceEntity" entityType="ConfigData" disabled="0"
clientOnly="1" label="Field Name" boldlabel="1" visible="1"
maxlength="255" req="0" datatype="picklist" displayfield=""
lookupsource="" lookupentity="" sourcefield="" query=" ">
            <option name="AccountPaymentTerms"
label="Account Payment Terms" value="account-paymenttermscode"
default="0" />
            <option name="AccountShippingMethod"
label="Account Shipping Method" value="account-
shippingmethodcode" default="0" />
            <option name="ContactPaymentTerms"
label="Contact Payment Terms" value="contact-paymenttermscode"
default="0" />
            <option name="ContactShippingMethod"
label="Contact Shipping Method" value="contact-
shippingmethodcode" default="0" />
            <option name="SalesOrderPaymentTerms"
label="Sales Order Payment Terms" value="salesorder-
paymenttermscode" default="0" />
            <option name="SalesOrderShippingMethod"
label="Sales Order Shipping Method" value="salesorder-
shippingmethodcode" default="0" />
            <option name="InvoicePaymentTerms"
label="Invoice Payment Terms" value="invoice-paymenttermscode"
default="0" />
            <option name="InvoiceShippingMethod"
label="Invoice Shipping Method" value="invoice-
shippingmethodcode" default="0" />
            <option name="ProductTypeCode" label="Product
Type Code" value="producttypecode" default="0" />
            <option name="AccountCategoryCode"
label="Account Category Code" value="accountcategorycode"
default="0" />
            <event name="onchange"
value="ShowEntityList( );" />
        </field>
        <field name="crmGrid" title="" entity=""
entityType="LinkGrid" disabled="0" clientOnly="1" label="Mapped
Values" boldlabel="0" visible="1" maxlength="255" req="0"
datatype="grid" displayfield="" lookupsource=""
lookupentity="account-paymenttermscode" sourcefield="" query=" "
/>
    </tab>
    <tab visible="1" type="edit" name="Publishing" title="This
tab allows you to determine which entities are published from
CRM." label="Published Entities">
        <field name="PublishingOptions" title="Publishing"
entity="" entityType="Options" disabled="0" clientOnly="0"
label="Publish To Microsoft Business Solutions - Great Plains"
boldlabel="0" visible="1" maxlength="0" req="1" datatype="sec"
displayfield="" lookupsource="" lookupentity="" sourcefield=""
query="" />
        <field name="PublishAccounts" title="" colspan="1"
col="1" description="(By turning off the publishing of Accounts,
the publishing of Orders and Addresses is no longer valid and
will also be turned off)" entity="PublishAccounts"
entityType="ServerPublish" disabled="0" clientOnly="0"
```

UI Configuration XML Instance for Dynamic UI.

```
label="Publish Accounts" boldlabel="0" visible="1" maxlength="4"
req="0" datatype="boolean" displayfield=" " lookupsource=""
lookupentity=" " sourcefield=" " query=" " />
        <field name="PublishContacts" title="" colspan="1"
col="1" description="(By turning off the publishing of Contacts,
the publishing of Orders and Addresses is no longer valid and
will also be turned off)" entity="PublishContacts"
entityType="ServerPublish" disabled="0" clientOnly="0"
label="Publish Contacts" boldlabel="0" visible="1" maxlength="4"
req="0" datatype="boolean" displayfield=" " lookupsource=""
lookupentity=" " sourcefield=" " query=" " />
        <field name="PublishAddresses" title="" colspan="1"
col="1" description="(By turning off the publishing of
Addresses, the publishing of Orders is no longer valid and will
also be turned off)" entity="PublishAddresses"
entityType="ServerPublish" disabled="0" clientOnly="0"
label="Publish Addresses" boldlabel="0" visible="1"
maxlength="4" req="0" datatype="boolean" displayfield=" "
lookupsource="" lookupentity=" " sourcefield=" " query=" " />
        <field name="PublishOrders" title="" colspan="1"
col="1" description="" entity="PublishOrders"
entityType="ServerPublish" disabled="0" clientOnly="0"
label="Publish Orders" boldlabel="0" visible="1" maxlength="4"
req="0" datatype="boolean" displayfield=" " lookupsource=""
lookupentity=" " sourcefield=" " query=" " />
        <field name="SchemaOptionsSep" title="" entity=""
entityType="Options" disabled="0" clientOnly="0" label=""
boldlabel="0" visible="1" maxlength="0" req="1" datatype="sec"
displayfield="" lookupsource="" lookupentity="" sourcefield=""
query="" />
        <field name="SchemaOptions" title="" entity=""
entityType="Options" disabled="0" clientOnly="0" label="Schemas"
boldlabel="0" visible="1" maxlength="0" req="1" datatype="sec"
displayfield="" lookupsource="" lookupentity="" sourcefield=""
query="" />
        <field name="PublishSchemas" title="Publish Schemas"
entity="" entityType="button" disabled="0" clientOnly="0"
label="Publish Schemas" boldlabel="0" visible="1" maxlength="4"
req="0" datatype="button" displayfield=" " lookupsource=""
lookupentity=" " sourcefield=" " query=" ">
            <event name="onclick"
value="ShowSchemaWindow( );" />
        </field>
    </tab>
    <tab visible="0" type="edit" name="Publishing" title=""
label="">
    </tab>
</Config>
```

The data set forth in Tables of FIG. 4 can be in accordance with any desired format. The following are sample configuration node records for a system-level configuration:

Sample Configuration Node records for a system-level configuration:

```
INSERT INTO [IntegrationEntityMapConfig] values ('{193CD26A-
B775-4A31-A892-17048854ADC9}','{3D4B9DFF-1221-4A5E-B78D-
0B02FC4E7B68}','CustomerCreationModeConfig',' ',1,'long','2')
GO
INSERT INTO [IntegrationEntityMapConfig] values ('{31573E69-
0946-4D01-824A-E8BF53C15011}','{3D4B9DFF-1221-4A5E-B78D-
0B02FC4E7B68}','CustomerAutoIncrementSuffixConfig,'
',1,'boolean','1')
GO
INSERT INTO [IntegrationEntityMapConfig] values ('{B85F79EB-
A7AF-498B-8027-6A8A7A6D20B1}','{3D4B9DFF-1221-4A5E-B78D-
0B02FC4E7B68}','CustomerStaticPrefixConfig',' ',1,'long','')
GO
INSERT INTO [IntegrationEntityMapConfig] values ('{392FAEC6-
5DF1-47DF-B46D-66270CA2A1FA}','{3D4B9DFF-1221-4A5E-B78D-
0B02FC4E7B68}','CustomerStaticSuffixConfig',' ',1,'long','')
```

-continued

Sample Configuration Node records for a system-level configuration:

```
GO
INSERT INTO [IntegrationEntityMapConfig] values ('{56EAE30E-
B0E6-466D-B34F-65566FA6C862}','{6F3236AE-5A53-4E06-8C5C-
E858E97CDAF6}','CustomerCreationModeConfig',' ',1,'long','2')
GO
INSERT INTO [IntegrationEntityMapConfig] values ('{4B406A3A-
1422-45BB-8D50-EA367B173124}','{6F3236AE-5A53-4E06-8C5C-
E858E97CDAF6}','CustomerAutoIncrementSuffixConfig','
',1,'boolean','1')
GO
INSERT INTO [IntegrationEntityMapConfig] values ('{5F5F3341-
854C-4D1B-B0BB-475A1CF416C3}','{6F3236AE-5A53-4E06-8C5C-
E858E97CDAF6}','CustomerStaticPrefixConfig',' ',1,'long','')
GO
INSERT INTO [IntegrationEntityMapConfig] values ('{2AB7BEC2-
E5D6-4F10-A729-299688174145}','{6F3236AE-5A53-4E06-8C5C-
E858E97CDAF6}','CustomerStaticSuffixConfig',' ',1,'long','')
GO
insert into IntegrationSystemConfig values ('{72F4F883-0FAF-
46D2-B537-115091272670}','{0BB67F9E-DDC4-4104-BDE5-
06E9457DFF24}','TTL','',0,'long','43200')
GO
insert into IntegrationSystemConfig values ('{B7EBEED2-1D04-
46F1-BAE7-3C170B03ACBC}','{478D1E9A-CFFA-46B1-9027-
26A8D8DA1BEB}','Datasource','',0,'string','')
GO
One example pick list schema along with sample data
is as follows:
PickList Schema and sample data:
Schema:
<xs:schema attributeFormDefault="unqualified"
elementFormDefault="qualified"
xmlns:xs="http://www.w3.org/2001/XMLSchema">
    <xs:element name="SY03300">
        <xs:complexType>
            <xs:sequence>
                <xs:element maxOccurs="unbounded" name="SY03300">
                    <xs:complexType>
                        <xs:attribute name="Entity" type="xs:string"
use="required" />
                        <xs:attribute name="Value" type="xs:string"
use="required" />
                        <xs:attribute name="Display" type="xs:string"
use="required" />
                    </xs:complexType>
                </xs:element>
            </xs:sequence>
            <xs:attribute name="Entity" type="xs:string"
use="required" />
            <xs:attribute name="Value" type="xs:string" use="required"
/>
            <xs:attribute name="Display" type="xs:string"
use="required" />
        </xs:complexType>
    </xs:element>
</xs:schema>
Instance:
    <SY03300 Entity="PaymentTerms" Value="2% 10/Net 30   "
Display="2% 10/Net 30         ">
        <SY03300 Entity="PaymentTerms" Value="2% EOM/Net 15th "
Display="2% EOM/Net 15th    " />
        <SY03300 Entity="PaymentTerms" Value="2% EOM/Net 30   "
Display="2% EOM/Net 30       " />
        <SY03300 Entity="PaymentTerms" Value="3% 15th/Net 30  "
Display="3% 15th/Net 30      " />
        <SY03300 Entity="PaymentTerms" Value="C.O.D.
Display="C.O.D.              " />
        <SY03300 Entity="PaymentTerms" Value="Cash
Display="Cash                " />
        <SY03300 Entity="PaymentTerms" Value="Check
Display="Check               " />
        <SY03300 Entity="PaymentTerms" Value="Credit Card
Display="Credit Card         " />
        <SY03300 Entity="PaymentTerms" Value="Due 20th
Display="Due 20th            " />
        <SY03300 Entity="PaymentTerms" Value="EOM
Display="EOM                 " />
        <SY03300 Entity="PaymentTerms" Value="Net 30
Display="Net 30              " />
        <SY03300 Entity="PaymentTerms" Value="Prepayment
Display="Prepayment          " />
    </SY03300>
One example specification for the ISystemProxy
interface used to query systems is as follows:
ISystemProxy interface :
namespace Microsoft.CRM.Integration
{
public interface ISystemProxy
{
bool InitializeConfigData(string configData);     //Used to
initialize configuration nodes.
string RetrievePickList(string queryData);        //Used to
retrieve a picklist as xml.
string Query(string queryData);                   //Generic query
interface.
bool ConfigurePublishing(string entityName,
                         bool Publish,
                         string Configuration);  //Used to
                         enable/disable entity publication.
string RetrieveSchema(string queryData,
                      string entityName);        //Used to
                      retrieve the schema for an entity.
}
}
```

The present invention provides a dynamic user interface for configuring the relationship between systems. The system provides for the storage of an XML layout of the user interface on an application service provider (ASP) page. The user interface can comprise a plurality of tabs with various user interface inputs located under each tab. Each of the inputs of the user interface input can be customized as a text box, label, checkbox, dropdown, table list, etc. Further, each object can be customized as to the target of its action. For example data can be targeted at the configuration data stored as integration meta data, default data passed to the integrated systems, or the creation of linked records in the integration itself. The present invention provides a combination of a markup language description (such as XML) of the user interface and a system specific assembly which is used to manage certain retrieval and configuration methods. The system specific assembly can be generated using any appropriate technique including automated techniques using system proxies. This provides a single interface to manage integration between multiple systems.

In the present invention, the user interface generator can be hosted in a web application. Illustratively, the user interface is designed to be similar to the user interface used to configure the systems being integrated. The integration engine includes a set of tables that contain a list of the systems that are integrated, the unique entities within those systems that are integrated, and the attributes of each of those entities. Each of these tables has a text field containing the user interface configuration in an XML string. Further, each of the tables also has a joined one-to-many table that contains a list of configuration nodes that may be used by the integration itself, or passed on to that entity every time a document is posted to it. Further, each integrated system can provide a system specific assembly that implements a specific interface. This interface controls retrieving entity schema and information, retrieving pick list data (for example as XML), a generic query used to return data (for example as XML) and a method to control the publication of data, for example.

The XML configuration field for each of the systems is passed to a main component of the user interface generator. The generator then proceeds to read each node and generate the appropriate user interface control. If the configuration is for a specific entity-to-entity mapping, an entry can be made in the XML configuration data that defines the source system, source entity and destination entity. The engine will then retrieve the appropriate configuration from that map, generate the appropriate user interface information and return the user interface information inside the main user interface XML string.

When an administrator chooses to save any changes from the user interface, another component is passed an XML string from the browser which contains the nodes that have actually been changed on the client. The implementation of this function can be through any appropriate technique such as code operated on a virtual machine. Upon receiving this data set, the user interface integration engine loops through each node and determines what type of save operation should be performed. If the save is for integration specific data, the data is passed to the integration platform to save in a storage operation. If the data to be saved is for creating a new link between entities, then that data is passed to another component in the integration platform that creates those links. Finally, if the data to be saved is system default data, it is stored in the meta data to be passed to the appropriate document.

With the present invention, a system specific assembly is used by a user interface generator to generate a dynamic user interface. The system specific assembly is a set of information which describes a particular system to be integrated. New systems can be added to the integration by simply adding new assemblies for each system. The assembly can be individually coded or can be automatically generated using a proxy through a common interface. The interface illustratively utilizes XML as a descriptor, however, other techniques can be used such as XSL (extensible stylesheet language), etc.

Although the present invention has been described with reference to preferred embodiments, workers skilled in the art will recognize that changes may be made in form and detail without departing from the spirit and scope of the invention.

What is claimed is:

1. A method of linking entities between a plurality of business applications in an integrated business solutions computing environment, comprising:
retrieving a first system specific assembly and first user interface configuration data for a first entity of a first application, wherein the first entity includes the first user interface configuration data and configuration data associated with a system level, an entity level, a system mapping level and an entity mapping level, wherein the first user interface configuration data provides a particular user interface for the first entity of the first application;
retrieving a second system specific assembly and second user interface configuration data for a second entity of a second application, wherein the second entity includes the second user interface configuration data and configuration data associated with a system level, an entity level, a system mapping level and an entity mapping level, wherein the second user interface configuration data provides a particular user interface for the second entity of the second application;
retrieving maps linking the first system specific assembly and the first entity to the second system specific assembly and the second entity, wherein the maps include user interface configuration data and configuration data associated with a system level, an entity level, a system mapping level and an entity mapping level;
dynamically generating a user interface with a dynamic mark up language string based upon the first system specific assembly, first user interface configuration data, second system specific assembly, second user interface configuration data and the retrieved maps, the dynamic mark up language string including a first user input field based on the first system specific assembly to provide a selectable map between the first and second entities to control mapping between the first and second entities.

2. The method of claim 1 wherein the dynamic mark up language string includes a second user input field which is based upon the first system specific assembly.

3. The method of claim 2 wherein the second user input field comprises a selectable input allowing selection among a plurality of entries.

4. The method of claim 3 including generating a plurality of second entries based upon the second system specific assembly.

5. The method of claim 2 wherein the second user input field comprises a pick list.

6. The method of claim 2 wherein the second user input field comprises a button.

7. The method of claim 2 wherein the second user input field comprises a tab.

8. The method of claim 2 wherein the second user input field comprises a check box.

9. The method of claim 1 wherein the business applications are executed on separate computer systems.

10. The method of claim 1 wherein the system specific assembly is related to a system level.

11. The method of claim 1 wherein the system specific assembly is related to an entity level.

12. The method of claim 1 wherein the system specific assembly is related to a system mapping level.

13. The method of claim 1 wherein the system specific assembly is related to an entity mapping level.

14. The method of claim 1 wherein the dynamic markup language string comprises an XML string.

15. The method of claim 1 including saving configuration data provided by a user in response to the dynamic mark up language string.

16. The method of claim 1 wherein the system specific assembly is retrieved from a data store.

17. The method of claim 16 including calling a system interface for each of the plurality of business applications.

18. The method of claim 1 including publishing selected entities in response to a user input.

* * * * *